US006367070B1

(12) United States Patent
Haghighat et al.

(10) Patent No.: US 6,367,070 B1
(45) Date of Patent: *Apr. 2, 2002

(54) MEANS AND METHOD FOR ESTABLISHING LOOP-LEVEL PARALLELISM

(75) Inventors: Mohammad R. Haghighat, Cupertino; Milind Girkar, Sunnyvale, both of CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/006,321

(22) Filed: Jan. 13, 1998

(51) Int. Cl.[7] ................................................. G06F 9/45
(52) U.S. Cl. ........................ 717/9; 717/4; 717/5; 717/6; 717/8
(58) Field of Search ............................... 717/5, 6, 8, 9, 717/4

(56) References Cited

U.S. PATENT DOCUMENTS 5,584,027 A * 12/1996 Smith ........................... 395/707
5,768,596 A * 6/1998 Chow et al. .................... 717/9
6,286,135 B1 * 9/2001 Santhanam

OTHER PUBLICATIONS

IBM Technical Disclosure Bulletin, "Do With —A High–Level Computer Programming Language Statement", Vol. 33, No 9, pp: 415–417, Feb./1991.*
Wolf et al., "A Loop Transformation Theory and an Algorithm to Maximize Parallelism", IEEE, pp. 452–471, Oct. 1991.*
Aho et al., "Compilers Principles, Techniques, and Tools", Addison–Wesley pub., pp. 602–609, 624–627, 638–647, 1988.*
Cytron et al., "Efficiently Computing Static Single Assignment Form and the Control Dependence Graph", ACM, pp. 451–490, 1991.*
M. R. Haghighat, *Symbolic Analysis for Parallelizing*. Kluwer Academic Publishers (1995), Contents pp. vii–ix, List of Figures pp. xi–xiii, Chapter 4–induction variables pp. 35–56.

* cited by examiner

*Primary Examiner*—Tuan Q. Dam
*Assistant Examiner*—Ted T. Vo
(74) *Attorney, Agent, or Firm*—Blakely, Sokoloff, Taylor & Zafman LLP (57) ABSTRACT

A method for recognizing a parallel executable region within a sequence of source code. The parallel executable region is identified by locating a loop structure within the sequence of source code. The loop structure includes a field controlled by an induction variable. Furthermore, the field is set in every iteration of the loop structure.

6 Claims, 5 Drawing Sheets

1. LOOP
2. IF (P --> flg & l) THEN EXIT
3. P --> flg l=1
4. IF (CONDITION A) THEN
5.     P --> flg l= '2

14.     P = P --> Left
15. ELSE IF (CONDITION B) THEN
16.     P--> flg & = ~2

19.     P = P --> Right
20. ELSE
21. EXIT
22. END IF
23. END LOOP

FIG. 5

MEANS AND METHOD FOR ESTABLISHING LOOP-LEVEL PARALLELISM

FIELD OF THE INVENTION

The present invention relates to the translation of source code into a machine language for computer systems. More particularly, the present invention relates to a compiler technique that identifies parallel regions of a sequential program, thus resulting in a subsequently compiled machine language that allows parallel execution among a group of processors or a single multithread processor.

BACKGROUND

Improvements in microprocessor designs has lead to microprocessors with a high operating frequency. Current microprocessor designs exceed operating frequencies of 100 megahertz ("MHz"). However, the increase in operating frequency has not lead to excepted performance gains. One of the main components affecting performance gains is created by the microprocessor execution units idling during delays in external memory access. The delays in external memory access are typically caused by either the inductive losses associated with off chip transmissions or due to the conventional design characteristics of secondary memory devices coupled to the microprocessor.

To counteract the performance losses associated with external memory access conventional microprocessor designs developed cache systems. The cache systems store copies of external data internal to the microprocessor, thus avoiding the performance loss created by accessing external memory. One disadvantage of the conventional cache system is that modifications of data within the cache have to be reflected in external memory. Similarly, modifications of data in the external memory have to be reflected in the cache. Accordingly, the correlation of data between cache and external memory requires extraneous circuitry while still introducing the delay associated with external memory access.

Access to external memory can also be reduced by providing the microprocessor with a sequence of instructions that operate solely within a contained area of main memory. Accordingly, the frequency of cache updates would be reduced because the microprocessor operates on data that is self-contained within main memory. Furthermore, identifying independencies within the instruction sequence would allow parallel execution (by one or more microprocessors) on data stored in main memory. Thus, minimizing external memory access. Accordingly, parallel execution greatly increases the throughput of instructions while reducing the latency of main memory access. The sequencing of instructions for parallel execution is referred to as multithreaded organization.

To provide multithreaded organization some software applications include multithreaded coding or use compilers. Multithreaded coding describes explicit parallelisms introduced into the source code by the programmer. Typically, these explicit parallelisms require that the programmer carefully define the boundaries of loops, threads, and amount of loop iterations so that a compiled source code will result in a machine language that promotes parallel execution by an operating system and/or microprocessor(s). One disadvantage, of this approach is that the programmer must be aware of all the possible translations from source code to machine language. A second disadvantage, of this approach results from the standard format used in current source code. Source code typically follows a syntactic organization geared towards ease of use for a programmer. In contrast, multithreaded coding follows an organization scheme orientated towards the processor or operating system executing the complied source code.

Alternatively, compilers are used to generate machine language that promotes parallel execution by an operating system and/or microprocessor(s). Compilers attempt to increase throughput of instructions by finding or guessing the boundaries of instructions that can be executed in parallel. Control-flow and data-flow analysis is used to predict the boundaries of instructions that can be executed in parallel. Control-flow analysis reveals the flow of controls in programs. This includes loop structures, branches, and procedure calls. Data-flow analysis, on the other hand, discovers the properties, values, and inter-relations of program variables.

Using the predicted boundaries, the compiler can create machine language organized for parallel processing. This speculative compiling of source code, however, may result in a costly performance loss because miscalculated boundary requires reversal of assumed parallel execution paths and a sequential execution of all remaining paths. Further, this speculative compiling is not applicable to pointer based applications because in pointer based applications a group of pointer are possibly pointing to the same memory location, thus resulting in data corruption. Accordingly, during parallel execution of pointer based applications different process can overwrite the same memory location.

SUMMARY OF THE INVENTION

A computer-implemented method for recognizing parallelisms within a source code is described. The method includes locating a loop within a sequence of instructions. Additionally, the method includes finding an induction variable within the loop and identifying a field controlled by the induction variable. The method also includes determining that the field is set in every iteration of the loop.

BRIEF DESCRIPTION OF THE DRAWINGS

The features and advantages of the present invention are illustrated by way of example and not limitation in the figures of the accompanying drawings in which like references indicate similar elements and in which.

DETAILED DESCRIPTION

A method including identifying a segment of source code that is subsequently compiled to generate a sequence of instructions for parallel execution is disclosed. The identification of a segment is dependent on a set of conditions—namely finding a loop within a sequence of instructions, finding an induction variable within the loop, and determining the characteristics of a field pointed to by the induction variable. For one embodiment, the identified segment is used by a subsequent compiling process to generate machine code that allows parallel execution of multiple iterations of the sequence of instructions between different processors. In an alternative embodiment, the identified segment is used by a subsequent processor to generate machine code that provides flags to a single multithread microprocessor. The flags allow the multithread microprocessor to schedule internal execution units for parallel processing of the sequence of instructions, provided multiple iterations are required.

An intended advantage of an embodiment of the present invention is to provide an identification flag for differentiating a sequence of source code that is executable in parallel from a sequence of source code that must be executed sequentially. The identification flag may be used in a subsequent compiling to generate machine code for parallel execution by a group of processors or a single multithread processor.

Another intended advantage of an embodiment of the present invention is to provide a parallel execution identification flag for pointer based applications. In particular, the identification flag is used during code generation of the pointer based application to delineate divisions of instructions that can be processed in parallel without overwriting the same memory allocations. Accordingly, when the compiled pointer based application is subsequently used to process a file, divisions of the file can be processed in parallel.

Typically an application program accessing or modifying data included within a file does not pass the entire content of a file as a variable. Instead a pointer is used by the program to indicate the memory location of a record entry within the file. Subsequently, algorithms within the application program traverse the different records within the file and access or modify the fields within the records according to the application program's specification. For one embodiment, the algorithm consists of a complied sequence of instructions that are used to process a file.

Figure 1:
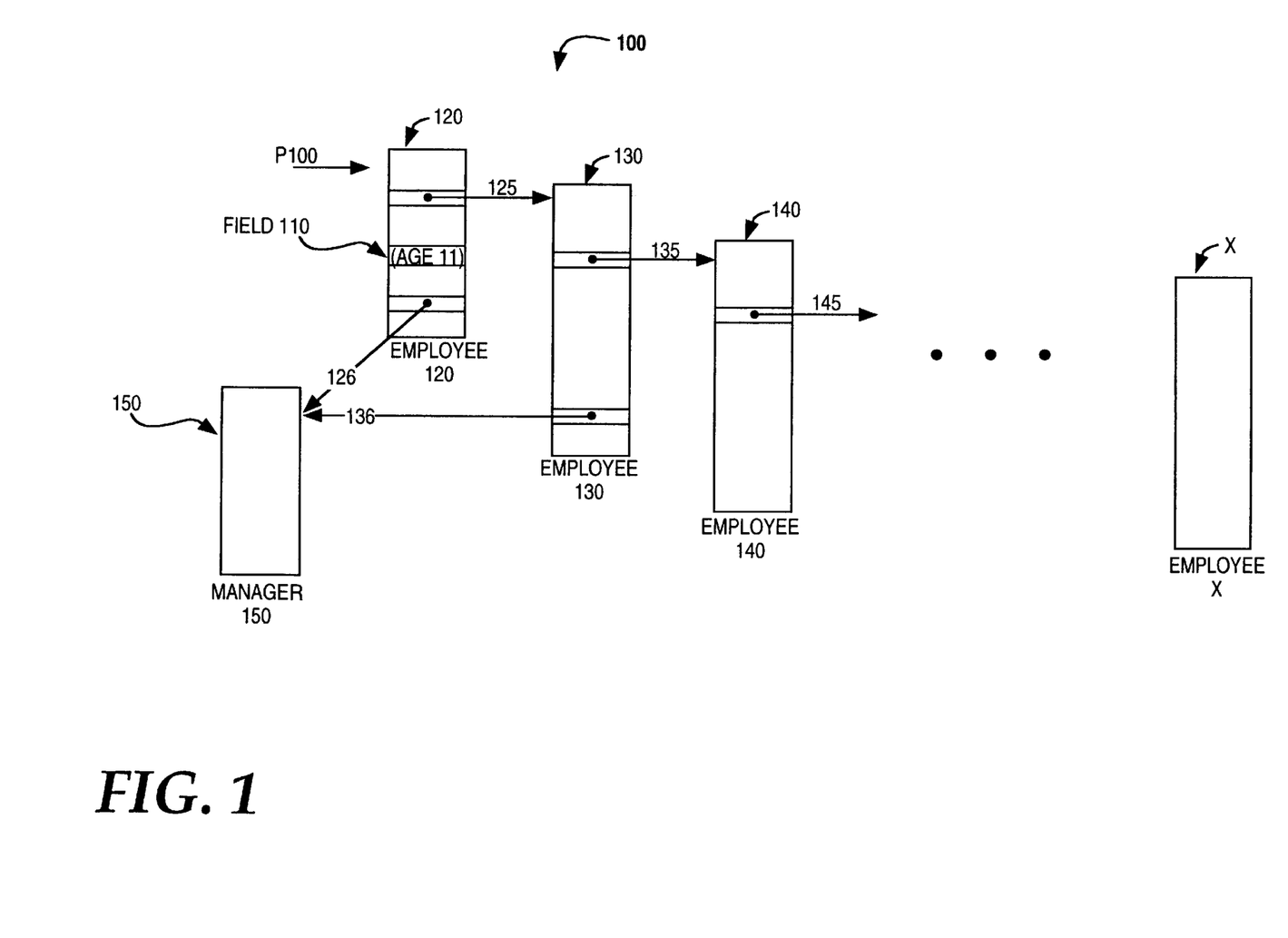
FIG. 1 shows one embodiment of a file comprising multiple records with interrelated fields.

FIG. 1 illustrates one embodiment of a file. File 100 includes record 120 through record X. Each record is composed of a set of related fields. Additionally, each record corresponds to an individual employee. For one embodiment, employee 120 has a field 110 denoted as AGE 11. Accordingly, AGE 11 correlates to the age of employee 120. For alternative embodiments, a field includes a variable, an array, a node or a pointer.

Each record in file 100 also includes two fields with a pointer. The pointers 125, 135, and 145 indicate the location of the next employee record. Pointers 126 and 136 both indicate the location of the manager record 150. Accordingly, both employee 120 and 130 have the same manager 150. Thus, as demonstrated in records 120 and 130 fields within different records can access the same memory location.

In FIG. 1, pointer P100 indicates the memory location of a first record within file 100. Accordingly, in one embodiment, an application program used to read or modify fields of employees 120–X or manager 150 begins in a memory location pointed to by P100 and process all records within the file. File 100 includes records for business applications. In alternative embodiments, file 100 includes editors, compilers, interpreters, and general object-oriented programs that are based on the use of pointers and indirections.

As illustrated in FIG. 1, two fields from different records can point to the same memory location. Accordingly, parallel execution of an instruction set on different records included in file 100 can overwrite the same memory location in the wrong order, thus resulting in data corruption. To ensure that the parallel execution does not create data corruption, the segment of the source code generating the instructions must satisfy a set of conditions. The set of conditions ensure that the compiled sub-routines will not overwrite the same memory location during parallel execution. In particular, the set of conditions look for a structure in the source code that will generate an instruction set that (1) ignores marked records or (2) marks the records as processed prior to or after completion of processing. This structure allows the concurrent processing of multiple records. Accordingly, in file 100 a segment of source code that process every employee once and only once satisfies the set of conditions. For one embodiment, the set of conditions is applied to a source code following a state diagram.

Figure 2:
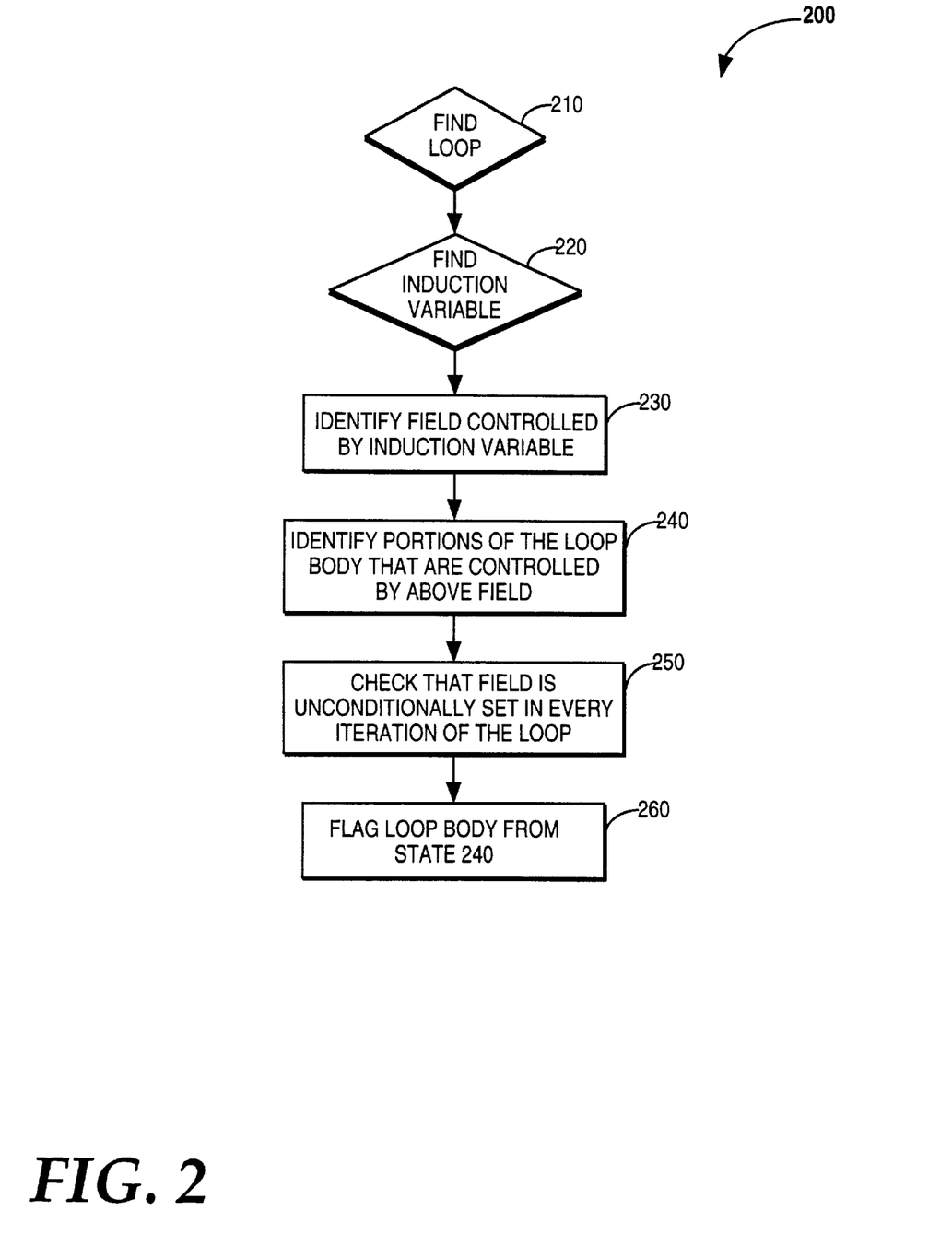
FIG. 2 shows one embodiment of a state machine diagram for identifying a segment of source code that will generate instructions executable in parallel.

FIG. 2 illustrates one embodiment of state transitions used to apply the afore mentioned set of conditions to a source code. State diagram 200 identifies a segment of source code that will generate parallel executable instructions. In particular, states 210 through 250 determine the boundaries, contents, and variables that constitute a segment of source that will generate a parallel executable instruction set. State 260 flags the segment of source code that follows the conditions determined by states 210 through 250. Accordingly, a subsequent compiling stage can uses the flags from state 260 to generate machine code following a multithreaded organization. For one embodiment, state diagram 200 is implemented as an intermediate stage within the compiling process that generates machine code/instructions from source code. In an alternative embodiment, state diagram 200 is implemented by one or more processors.

Figure 3:
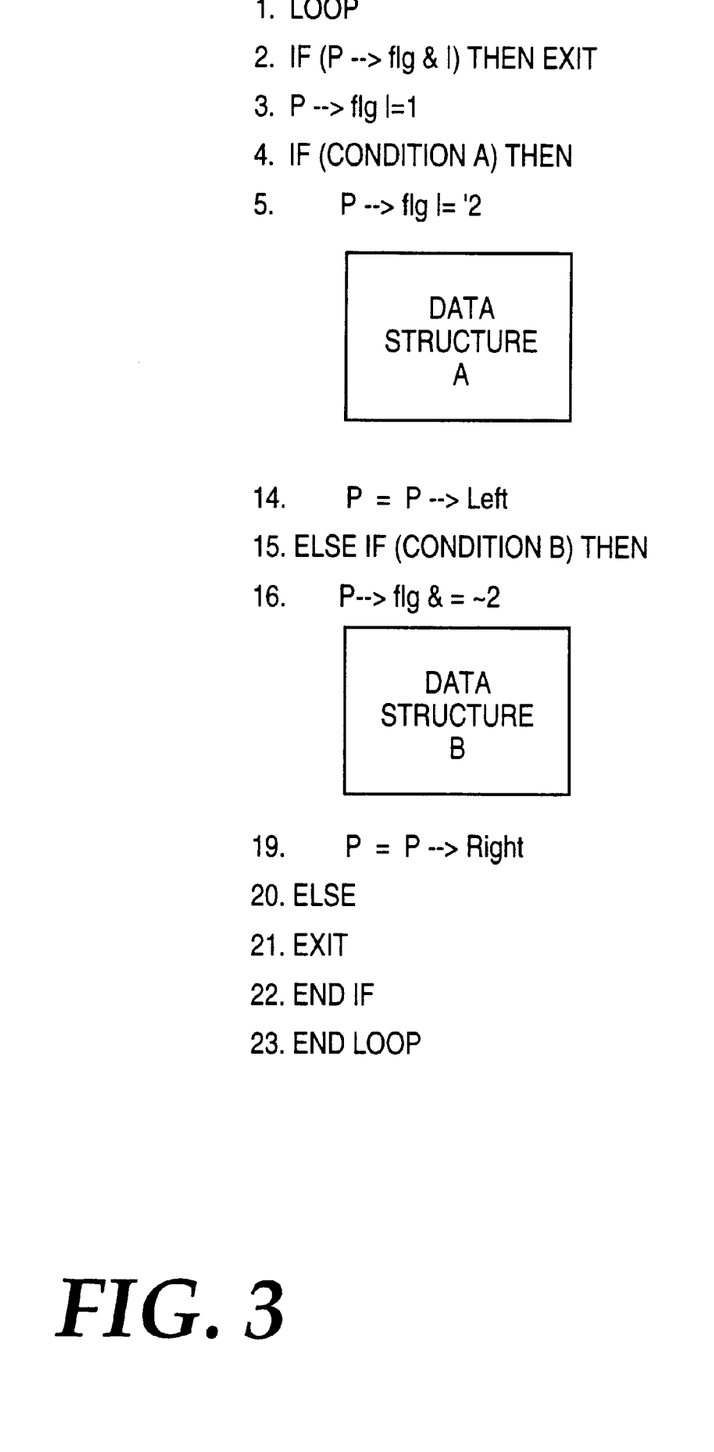
FIG. 3 shows one embodiment of a sequence of source code identified for parallel execution.

Source code comprises a sequence of syntactic instructions. In state 210, a loop within the source code is identified. For one embodiment the boundaries of a loop are determined by a parser. In particular the source code follows a programming language rule that has a prescribed syntactic structure. Accordingly, the parser uses these programming language rules is able to identify a loop with the source code. In an alternative embodiment, control flow analysis is used to determine the boundaries of a loop within the source code. In yet another embodiment, recursive function calls are identified as loops. FIG. 3 illustrates one embodiment of a sequence of source identified for parallel execution. Accordingly, state 210 identifies lines one and lines twenty-three as the boundaries of a loop. Provided a loop is found within the source code, state diagram 200 transitions to state 220.

In state 220, induction variables within the identified loop are identified. In an array based loop, the induction variable is a variable within the loop whose value is incremented or decremented by some constant for every iteration of the loop. In a pointer based application, the induction variable, for one embodiment, includes a pointer to a record where a value contained within the record is assigned to the pointer in each iteration of the loop, however, the assigned value is not modified within the body of the loop. The modification of the pointer allows the processing of different records in different iterations.

Referring to FIG. 3, the variable 'P' in line two illustrates a pointer that is assigned a non modified value. In particular, 'P' is assigned 'P ->Left' and 'P ->Right' in lines fourteen and nineteen, respectively. However, the value that are assigned to 'P' are not modified within the loop body because the fields 'Left' and 'Right' are not assigned within the loop. Accordingly, the variable 'P' in line two qualifies as an induction variable and would be identified in state 220. Provided an induction variable is found within the loop, state code diagram 220 transitions to state 230.

In state 230 a field controlled by the induction variable of state 220 is identified. An induction variable controls a field by pointing to the field within the record and conditioning execution of the subsequent lines of source code dependent on a value maintained in the field. For one embodiment, an IF - THEN conditional statement is applied to an induction variable. Accordingly, the location pointed to by the induction variable qualifies as a field controlled by an induction variable. For alternative embodiments, DO-WHILE or WHILE conditions applied to an induction variable create fields controlled by an induction variable.

Referring to FIG. 3, if the statement 'CONDITION A' or 'CONDITION B' preface/operate on the induction variable 'P' from line two then the variable 'flg' constitutes a field controlled by an induction variable. Provided a field controlled by the induction variable exist within the loop, state diagram 200 transitions to state 240.

The lines of source code controlled by the field from state 230 are identified in state 240. In particular, the sequence of source code included with the boundaries of the conditional statement applied to the induction variable are identified in state 240. For one embodiment, the lines of source code operated in conjunction with the afore mentioned IF-THEN statement are identified in state 240.

Referring to FIG. 3, lines five through fourteen are identified in state 240. Similarly, lines sixteen through twenty, of FIG. 3, are identified in state 240. In an alternative embodiment, 'CONDITION B' does not operate on the induction variable, accordingly lines five through twenty are identified in state 240. Provided a segment of source code is identified in state 240, state diagram 200 transitions to state 250.

In state 250, the field identified in state 230 is checked to determine that the field is unconditionally set in every iteration of the loops. In particular, the variable pointed to by the induction variable of state 220 must remain unmodified in every possible path of the loop identified in state 210. Accordingly, referring to FIG. 3, the variable 'flg' is set in line three and can not be conditionally modified during different iterations of the loop by 'CONDITION A' or 'CONDITION B'. Provided that states 210 through 250 are satisfied, in state 260 the loop body described in state 240 is flagged/identified. During a subsequent compiling stage the flagged segment is used to generate machine code following a multithreaded organization.

For one embodiment, state diagram 200 ensure that the flagged segment of source code will generate a parallel executable instruction set that will not result in data corruption when a group of processors are concurrently processing records within a file. In an alternative embodiment, state diagram 200 ensure that the flagged segment of source code will generate a parallel executable instruction set that will not result in data corruption when a multithreaded processor concurrently process data within a file.

For illustrative purposes, state diagram 200 describes locating a single induction variable within a loop and the corresponding field controlled by the induction variable. In alternative embodiments, however, multiple induction variables are possible within a loop. Each induction variable and corresponding field are examined following states 220 through 260, thus possibly creating multiple segments for parallel execution within a given loop.

Figure 4:
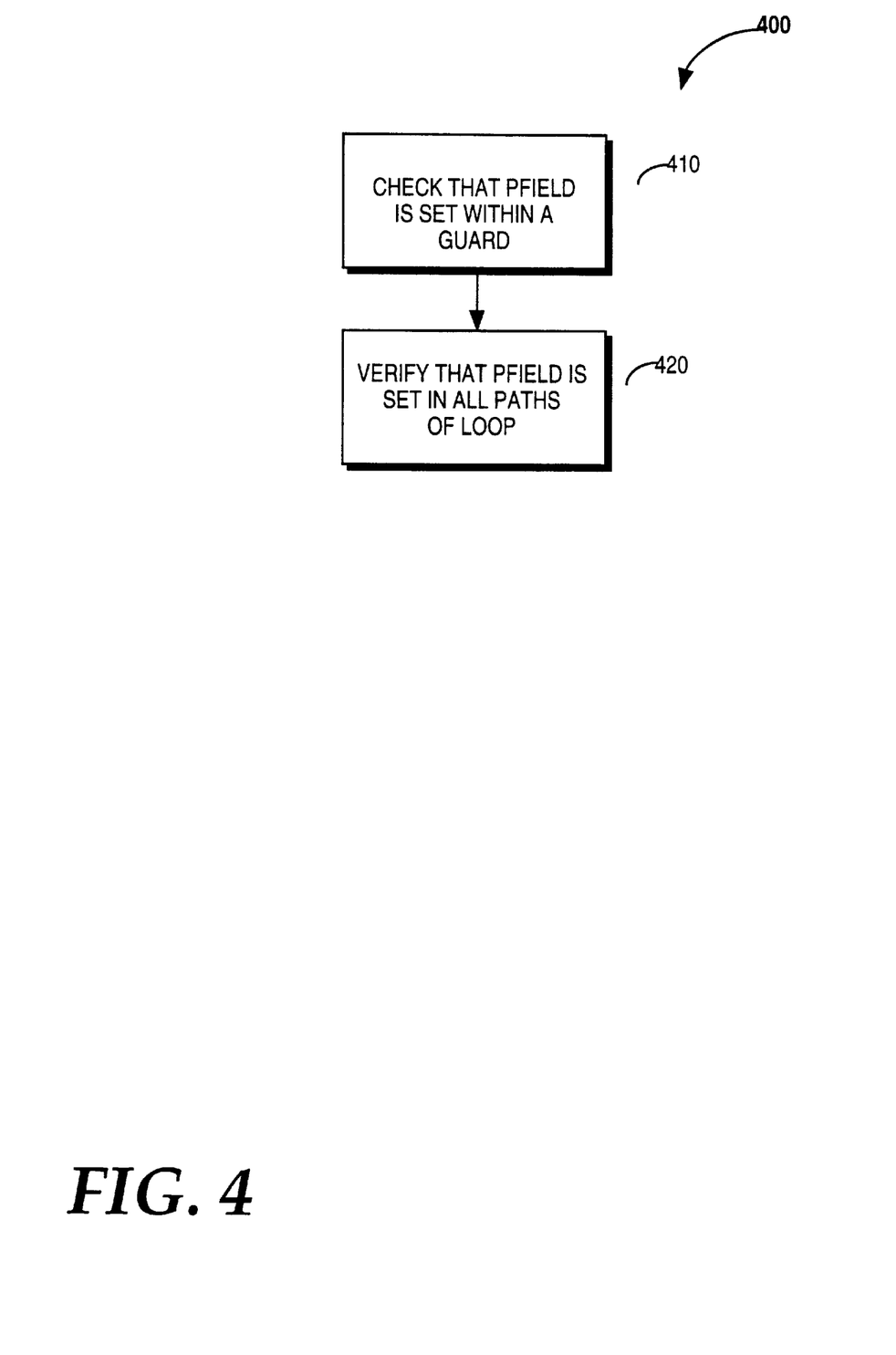
FIG. 4 shows one embodiment of a state machine diagram to determine whether a field is unconditionally set.

FIG. 4 illustrates one embodiment of state transitions used to determine whether a field pointed to by an induction variable is unconditionally set for every iteration of a loop. State diagram 400 includes state 410 and state 420. In one embodiment, states 410 and 420 comprise state 250 of FIG. 2. Accordingly, the term Pfield in state diagram 400 describes the address location pointed to by the induction variable identified in state 220.

State 410 checks to determine whether the Pfield is set within a guard. In particular, a guard refers to the initial condition that controls execution of a record. Accordingly, state 410 determines whether the Pfield or the guard are modified within the identified loop or a target of variable assignments extraneous to the loop. State 410 also determines whether procedure calls are passing the address of Pfield for modifications. For one embodiment, the compiler tracks every variable modified within the source code, thus a difference in variables is used to determine the modification of a Pfield or a guard.

Referring to FIG. 3, in line 2 within an IF-THEN clause the induction variable 'P' points to 'fig'. Thus 'fig' is a Pfield that is guarded. In line three, the Pfield 'fig' is set by a logical or of 'fig' with the value '1'. Accordingly, the value 'fig' can not be varied within the loop. In particular, even though lines five and sixteen modify the 'fig' value a tag within the Pfield remains unmodified. For one embodiment, the tag within the Pfield 'fig' is the last a bit in the value 'fig' as set in line 3. Accordingly, 'fig' is set within the body of the loop. Provided the Pfield is set and the guard is not modified within the loop, state diagram 400 transitions to state 420.

State 420 ensures that Pfield is set in every path within the loop. In particular, state 420 verifies that the field is not guarded conditionally within an identified loop. For example, referring to FIG. 3, if the 'flg' value is moved into the loop body of 'CONDITION A' or 'CONDITION B' the field is set conditionally because CONDITION A or CONDITION B are not always visited for every iteration of the loop. Thus, the segment of code can not be executed in parallel. State 420 ensures that the setting of a field is not nested within a conditional statement. However, if a field is set in all paths within a loop, state 420 is satisfied. Provided that sate 420 is satisfied the field is identified as unconditionally set for every iteration of a loop, thus allowing transition to the flagging stage of state 260.

Figure 5:
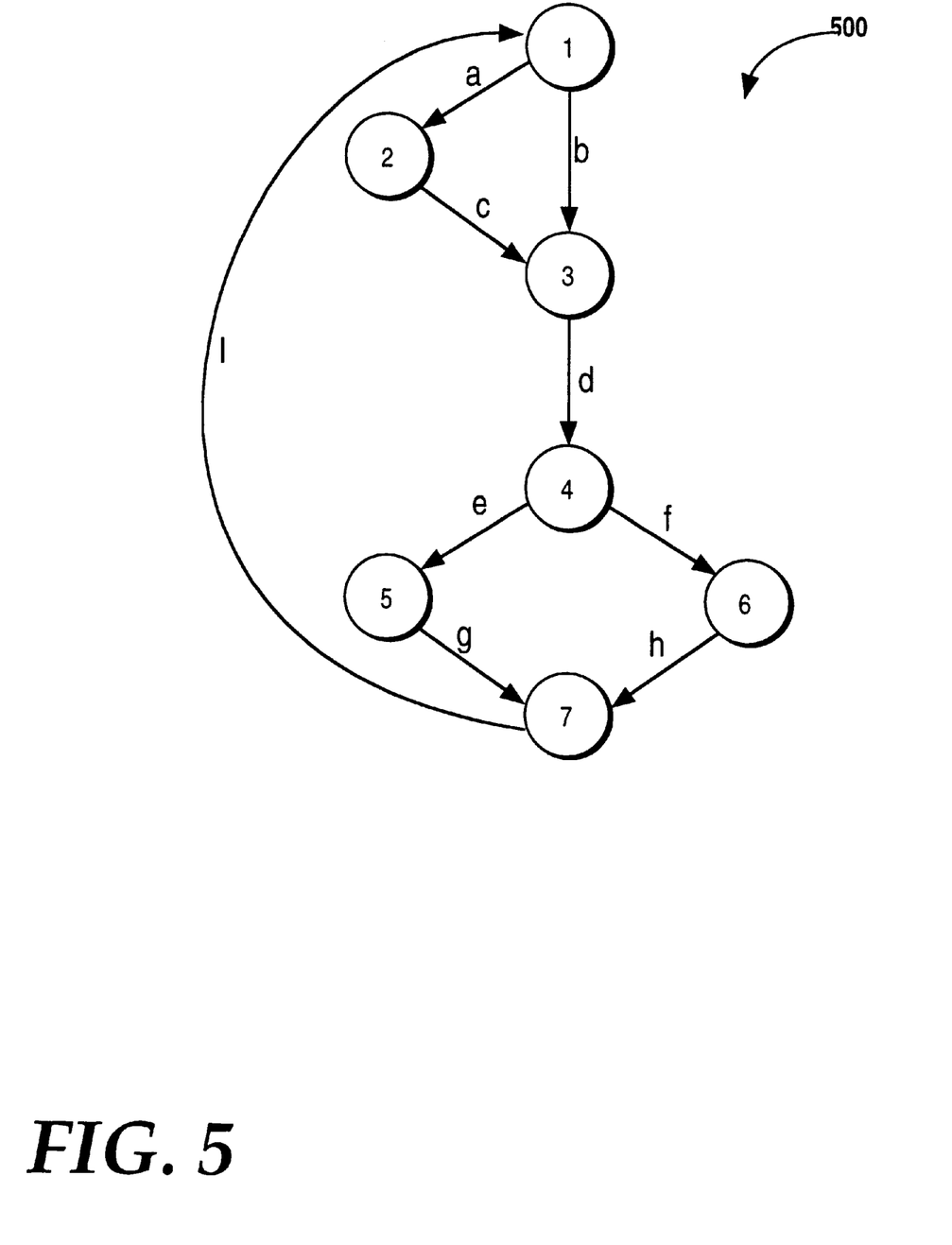
FIG. 5 illustrates multiple paths within a loop.

FIG. 5 illustrate one embodiment of possible paths within a loop. Loop 500 traverses from node one to node seven through a variety of different paths and returns to node one after node seven. The different paths are denoted by letters 'a' through 'i'. Accordingly, if a field is set in accordance with state 250 or state diagram 400, the field must be set in a location or locations of the source code that cover all possible paths within the loop. For example, analogous to line two of FIG. 3, a field may be set within node 1. Thus, in multiple iterations the field can only be set once. In contrast, if a field is set in node 2 the source segment can not be identified for parallel execution because the field is set conditionally within the body of the loop. Accordingly, different iterations would not set the field pointed to by the induction variable and a record may not be marked as processed. Thus, resulting in multiple processing which in turn leads to data corruption.

In the foregoing specification, the invention has been described with reference to specific exemplary embodiments thereof. It will, however, be evident that various modifications and changes may be made thereof without departing from the broader spirit and scope of the invention as set forth in the appended claims. The specification and drawings are, accordingly, to be regarded in an illustrative rather than a restrictive sense.

What is claimed:

1. A computer implemented method for identifying loop-level parallelism within a sequence of instructions comprising:
   identifying a loop within said sequence of instructions in a pointer based application;
   identifying an induction variable within said loop;
   identifying a field controlled by said induction variable;
   determining that said field is unconditionally set during an iteration of said loop;
   determining that said field is set within a guard;
   determining that said field is set in all paths within said loop; and in response to determining that said field is unconditionally set during an iteration of said loop, flagging said loop within said sequence of instructions wherein a compiler routine implements the method.

2. The method of claim 1, wherein the identifying the induction variable further includes identifying a segment within said sequence of instructions that is controlled by said field, said segment describing said loop-level parallelism.

3. A computer readable media having stored thereon a sequence of instructions, said sequence of instructions including a first set of instructions for identifying loop-level parallelism within a sequence of instructions, said first set of instructions, which when executed by said processor, causes said processor to perform a method comprising:
   identifying a loop within said sequence of instructions in a pointer based application;
   identifying an induction variable within said loop;
   identifying a field controlled by said induction variable;
   determining that said field is set for every iteration of said loop,
   determining that said field is set within a guard;
   determining that said field is set in all paths within said loop; and
   in response to determining that said field is set for every iteration of said loop, flagging said loop within said sequence of instructions, wherein a compiler routine implements the method.

4. The computer readable media of claim 3, wherein the identifying an induction variable within said loop further includes identifying a segment within said sequence of that is controlled by said field, said segment describing said loop-level parallelism.

5. A digital processing system having a processor operable to identify loop-level parallelism within a sequence of instructions, said identification of said loop-level parallelism causing said processor to:
   identify a loop within said sequence of instructions in a pointer based application;
   identify an induction variable within said loop;
   identify a field controlled by said induction variable;
   determine that said field is set within a guard;
   determine that said field is set in all paths within said loop;
   determine that said field is unconditionally set during an iteration of said loop; and
   in response to determining that said field is unconditionally set during an iteration of said loop, flagging said loop within said sequence of instructions, wherein a compiler routine identifies a loop within said sequence of instructions in a pointer based application and determines that said field is unconditionally set during an iteration of said loop.

6. The digital processing system of wherein a parser within said software compiler causes said identification of said loop-level parallelism to occur.

* * * * *

UNITED STATES PATENT AND TRADEMARK OFFICE
CERTIFICATE OF CORRECTION

PATENT NO.   : 6,367,070 B1
DATED        : April 2, 2002
INVENTOR(S)  : Haghighat et al.

It is certified that error appears in the above-identified patent and that said Letters Patent is hereby corrected as shown below:

<u>Column 8,</u>
Line 31, delete "system of wherein" and insert -- system of claim 5 wherein --.

Signed and Sealed this

Eighth Day of October, 2002

*Attest:*

*Attesting Officer*

JAMES E. ROGAN
*Director of the United States Patent and Trademark Office*